United States Patent Office 2,917,523
Patented Dec. 15, 1959

---

2,917,523

PRODUCTION OF COMPOUNDS OF THE VITAMIN A SERIES

Horst Pommer, Ludwigshafen (Rhine), and Georg Wittig, Tubingen, Germany, assignors to Badische Anilin- & Soda-Fabrik Aktiengesellschaft, Ludwigshafen (Rhine), Germany No Drawing. Application July 27, 1956
Serial No. 600,404

Claims priority, application Germany August 3, 1955

5 Claims. (Cl. 260—410.9)

This invention relates to an improved process for the production of compounds of the vitamin A series.

We have found that compounds of the vitamin A series are obtained by reacting a beta-ionyl halide with a tertiary phosphine, for example triphenyl phosphine, to form a quaternary phosphonium halide, reacting this, preferably in dimethylformamide solution, with about an equivalent amount of a compound capable of binding hydrogen halide, as for example an alkali or alkaline earth metal alcoholate or an alkali metal acetylide or amide to form the beta-ionylidene-phosphine-ylide, allowing an aldehyde of the general formula $$O=CH-CH=CH-C(CH_3)=CH-R$$

(in which R is a lower alkyl, carboxylic acid ester or a $CH_2OH$ group which may be etherified or esterified) to act thereon, and separating the phosphine oxide formed as a byproduct.

When using beta-ionyl bromide, triphenyl phosphine, sodium acetylide and 4-methyl-hexadiene-(2.4)-al-(1)-acid-(6)-ethyl ester as initial materials, the reaction may be formulated as follows:

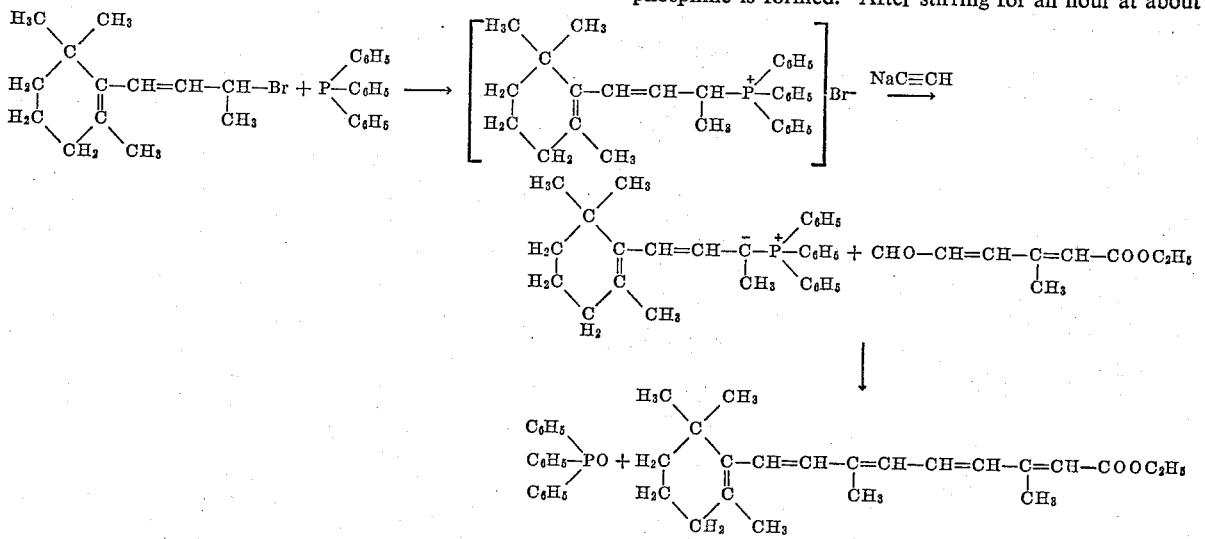

Instead of triphenylphosphine other tertiary phosphines, in particular triarylphosphines, such as tri-p-tolyl-, p-tolyl-diphenyl-, tri(chlorophenyl)- or naphthyl phenyl phosphines are suitable. Instead of beta-ionyl bromide there may be used beta-ionyl chloride or iodide. Instead of 4-methylhexadiene-(2.4)-al-(1) acid-(6)-ethylester there may be used, for example, the corresponding methyl, isopropyl, hexyl or cyclohexylesters. If 4-methyl-hexadiene-(2.4)-al-(1) is used, there is obtained pure axerophthene; by using 4-methyl-6-methoxy-hexadiene-(2.4)-al-(1) the vitamin A alcohol methyl ether is obtained.

The new process permits the synthesis of compounds of the vitamin A series in a very simple manner and results in good yields of pure end products; it is simpler than the processes hitherto known (see for example "Fortschritte der Chemie organischer Naturstoffe," Springer-Verlag, Vienna, 1952, volume IX, pages 56 et seq.) and, contrary to known processes (see the review given by H. O. Huisman et al., Recueil des Travaux Chimiques des Pays-Bas, vol. 71 (1952), p. 911) gives no "retro-rearrangement" of the conjugated system of double bonds. The products obtainable according to the present invention, such as vitamin A, vitamin A acid, vitamin A ether and axerophthene, are known to be valuable pharmaceutical products.

The following examples will further illustrate this invention but the invention is not restricted to these examples. The parts specified are parts by weight.

Example 1

A solution of 18 parts of phosphorus tribromide in 80 parts of absolute ether is gradually introduced while stirring into a solution of 20 parts of pure beta-ionol (see H. H. Inhoffen, F. Bohlmann and M. Bohlmann, Ann. 565 (1949), p. 35) in 150 parts of absolute ether at $+15°$ to $+20°$ C. After stirring for 12 hours at room temperature, the mixture is poured onto ice and the ethereal layer is decanted off and washed well with water. The ether solution is dried for 2 hours with calcium chloride and then concentrated somewhat under reduced pressure. After adding 22 parts of triphenyl phosphine, it is stirred for 5 hours at room temperature. The solvent is then distilled off and the residue heated to $80°$ to $90°$ C. in a water-jet vacuum for 30 minutes. The phosphonium bromide, which partly crystallizes, is dissolved in 150 parts of dimethylformamide and while stirring at room temperature 4.5 parts of finely powdered sodium acetylide are added. The mixture immediately becomes reddish-brown and the beta-ionylidene-triphenyl-phosphine is formed. After stirring for an hour at about $20°$ C., a solution of 5 parts of 4-methylhexadiene-(2.4)-al-(1)-acid-(6)-ethyl ester in 15 parts of dimethylformamide is added. A slight rise in temperature occurs; it is stirred for another 2 hours, added to a mixture of ice and 10% phosphoric acid and extracted with petroleum ether. The pale yellow petroleum ethereal solution is washed with water, dried over sodium sulfate and kept at $-5°$ C. for 10 hours. It is then filtered by suction in order to separate the deposited triphenyl phosphine oxide. From the filtrate all the constituents boiling below $100°$ C. at 0.001 Torr. pressure are distilled off. The residue consists of vitamin A acid ethyl ester ($\lambda_{max}=351$ to 353 millimicrons, $\epsilon=28,500$ (in methanol)), from which by alkaline saponification 4.8 parts of vitamin A acid can be obtained as yellow needles of the melting point 181° to 182° C.

*Example 2*

To a solution of beta-ionylidene-triphenyl-phosphine in dimethylformamide, prepared from 20 parts of beta-ionol as in Example 1, there is added a solution of 6 parts of gamma-methyl-sorbic aldehyde (=4-methyl-hexadiene-(2.4)-al-(1) in 20 parts of dimethylformamide. Reaction takes place with a rise in temperature and is completed after stirring for 2 hours without further supply of heat. It is then poured onto a mixture of ice and 10% phosphoric acid and extracted with petroleum ether. The petroleum ether solution is washed neutral with water, dried over sodium sulfate and kept for 12 hours at −5° C. It is then filtered through a short column of aluminum oxide and the filtrate distilled. 4.3 parts of pure axerophthene of the boiling point 140° to 143° C. at 0.0 Torr. are obtained as a yellow viscous oil ($\lambda_{max}=$ 322 to 324 millimicrons, $\epsilon=38,000$ (in hexane)) giving a red violet color with antimony chloride.

The true axerophthene thus obtained is different from the "retro-axerophthene" of P. Karrer et al., see Helvetica Chimica Acta, vol. 35 (1952), p. 2570.

*Example 3*

A solution of 40 parts of phosphorus tribromide in 60 parts of absolute ether is gradually introduced at +10° C. while stirring into a solution of 40 parts of beta-ionol in 250 parts of absolute ether. After stirring for 6 hours, it is poured onto ice and washed well with water. The washed ethereal solution of beta-ionyl bromide is shaken with 20 parts of calcium chloride for 20 minutes, filtered and freed from solvent under reduced pressure at a maximum bath temperature of 35° C. The crude beta-ionyl bromide thus obtained is stirred into 45 parts of fused triphenyl phosphine, beta-ionyl-triphenyl-phosphonium bromide thereby being formed with spontaneous heating up to about 90° C. The yield amounts to about 100 parts.

Into the solution of this phosphonium salt in 200 parts of dimethylformamide there is gradually introduced a 10% methanolic solution of sodium methylate until a pH value of 7.9 is reached. Into the resultant dark violet solution of beta-ionylidene-triphenyl phosphine there is allowed to flow gradually while stirring a solution of 30 parts of 4-methyl-hexadiene-(2.4)-al-(1)-acid-(6)-ethyl ester in 30 parts of dimethylformamide. After heating for 60 minutes at 70° C., the methanol is distilled off in vacuo and the dimethylformamide solution poured on a mixture of ice and 10% sulfuric acid while stirring. It is then extracted with petroleum ether; the extract washed neutral with water is dried with sodium sulfate for 5 hours at −5° C. After expelling the solvent there remain 50 parts of residue which consists substantially of cis-vitamin A acid ethyl ester.

The following procedures may be followed for isolating free cis-vitamin A acid from the reaction product or converting it into trans-vitamin A ester:

*Cis-vitamin A acid.*—25 parts of the crude cis-ester obtained as above are dissolved in 150 parts of ethanol and boiled under reflux for 30 minutes with 5 parts of potassium hydroxide dissolved in 10 parts of water. The ethanol and the unsaponifiable low molecular weight constituents are distilled off with steam. After acidification with 10% phosphoric acid, taking up the precipitated acid with ether and evaporating off the ether, 11 parts of pale yellow crystals are obtained which after recrystallization from methanol melt at 146° C. ($\lambda_{max}=330$ millimicrons, $\epsilon=42,000$ (in methanol)); it accordingly consists of cis-vitamin A acid.

*Trans-vitamin A acid ethyl ester.*—25 parts of the crude cis-ester obtained as above are distilled in a high vacuum, the trans-vitamin A acid ethyl ester ($\lambda_{max}=351$ millimicrons, $\epsilon=38,000$ (in methanol)) passing over in a yield of 13 parts at 145° to 150° C. under a pressure of 0.005 Torr. The trans-vitamin A acid of the melting point 181° to 182° C. can be obtained therefrom by saponification as described above for the cis-acid.

What we claim is:

1. An improved process for the production of compounds of the vitamin A series which comprises mixing a beta-ionyl halide with a triarylphosphine, adding to the quaternary phosphonium halide formed by the interaction of the beta-ionyl halide and the triarylphosphine about an equivalent amount of a compound capable of binding hydrogen halide and selected from the group consisting of alkali metal alcoholates, alkaline earth metal alcoholates, alkali metal acetylides and alkali metal amides, splitting off of hydrogen halide, then mixing with the reaction mass an aldehyde of the general formula $$O=CH-CH=CH-C(CH_3)=CH-R$$

in which R represents a member of the group consisting of lower alkyl and carboxylic acid lower alkyl ester and separating the tertiary phosphine oxide from the reaction mixture.

2. An improved process for the production of vitamin A acid ethyl ester which comprises mixing beta-ionyl bromide with triphenyl phosphine, adding to the quaternary phosphonium bromide formed by the interaction of the beta-ionyl bromide and the triphenyl phosphine about an equivalent amount of a compound capable of binding hydrogen halide and selected from the group consisting of alkali metal alcoholates, alkaline earth metal alcoholates, alkali metal acetylides and alkali metal amides, splitting off of hydrogen bromide, then mixing with the reaction mass 4-methylhexadiene-(2.4)-al-(1)-acid-(6)-ethyl ester and separating the triphenyl phosphine oxide from the reaction mixture by filtration.

3. An improved process for the production of axerophthene which comprises mixing beta-ionyl bromide with triphenylphosphine, adding to the quaternary phosphonium bromide formed by the interaction of the beta-ionyl bromide and the triphenyl phosphine about an equivalent amount of a compound capable of binding hydrogen halide and selected from the group consisting of alkali metal alcoholates, alkaline earth metal alcoholates, alkali metal acetylides and alkali metal amides, splitting off of hydrogen bromide, then mixing with the reaction mass 4-methyl-hexadiene-(2.4)-al-(1) and separating the triphenyl phosphine oxide from the reaction mixture by filtration.

4. The process as claimed in claim 2 wherein the reaction of the quaternary phosphonium halide and said compound capable of binding hydrogen halide and also the reaction of said reaction mass and said ester are carried out in solution in dimethylformamide.

5. The process as claimed in claim 3 wherein the reaction of the quaternary phosphonium halide and said compound capable of binding hydrogen halide and also the reaction of said reaction mass and said ester are carried out in solution in dimethylformamide.

References Cited in the file of this patent

UNITED STATES PATENTS 2,540,118     Isler                    Feb. 6, 1951
2,819,312     Isler et al.             Jan. 7, 1958

OTHER REFERENCES

Milas et al.: J. Am. Chem. Soc. 57, 580 to 2 (1935).
Wittig et al., Ber. 87, 1318 to 1326 (1954).